(12) United States Patent
Parks (10) Patent No.: US 7,508,436 B2
(45) Date of Patent: Mar. 24, 2009

(54) METHOD FOR CAPTURING A SEQUENCE OF IMAGES IN CLOSE SUCCESSION

(75) Inventor: Christopher Parks, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 598 days.

(21) Appl. No.: 11/169,852

(22) Filed: Jun. 29, 2005

(65) Prior Publication Data

US 2007/0002165 A1 Jan. 4, 2007

(51) Int. Cl.
H04N 3/14 (2006.01)
(52) U.S. Cl. .................. 348/320; 348/312; 348/322; 348/296
(58) Field of Classification Search .......... 348/367, 348/283, 321, 320, 322
See application file for complete search history.

(56) References Cited

U.S. PATENT DOCUMENTS

| | | | | |
|---|---|---|---|---|
| 3,777,061 A | * | 12/1973 | Takemura | 348/283 |
| 4,811,068 A | * | 3/1989 | Kinoshita | 257/232 |
| 4,959,724 A | * | 9/1990 | Ueda | 348/320 |
| 5,491,642 A | * | 2/1996 | Wormell et al. | 702/49 |
| 5,546,127 A | * | 8/1996 | Yamashita et al. | 348/297 |
| 5,990,503 A | * | 11/1999 | Ingram et al. | 257/236 |
| 6,549,647 B1 | * | 4/2003 | Skunes et al. | 382/150 |
| 7,176,972 B2 | * | 2/2007 | Mutoh et al. | 348/315 |
| 2002/0141002 A1 | * | 10/2002 | Takano et al. | 358/513 |

OTHER PUBLICATIONS

Luiz M. Lourenco and A. Krothapalli, "True Resolution PIV: A Mesh-free Second Order Accurate Algorithm," from the *Proceedings of the International Conference in Applications of Lasers to Fluid Mechanics*, Lisbon, Portugal, Jul. 2000, pp. 1-21.

* cited by examiner

Primary Examiner—Ngoc-Yen T Vu
Assistant Examiner—Gary C Vieaux
(74) Attorney, Agent, or Firm—Peyton C. Watkins (57) ABSTRACT

A method for capturing a sequence of images, the method includes the steps of capturing a first image on an image sensor having a plurality of photosensitive areas having a first portion of photosensitive areas and a second portion of photosensitive areas; transferring the first portion of the first captured image to a first plurality of storage mechanisms; capturing a second image on the image sensor; transferring the second portion of the second captured image to a second plurality of the storage mechanisms; capturing a third image on the image sensor; reading out the first portion of the first captured image from the first plurality of storage mechanisms and reading out the second portion of the second captured image from the second plurality of storage mechanisms; and reading out the third image.

9 Claims, 12 Drawing Sheets

METHOD FOR CAPTURING A SEQUENCE OF IMAGES IN CLOSE SUCCESSION

FIELD OF THE INVENTION

The invention relates generally to the field of image sensors that capture images closely spaced in time. More specifically, the invention relates to images sensors that capture three images in close succession.

BACKGROUND OF THE INVENTION

Figure 1:
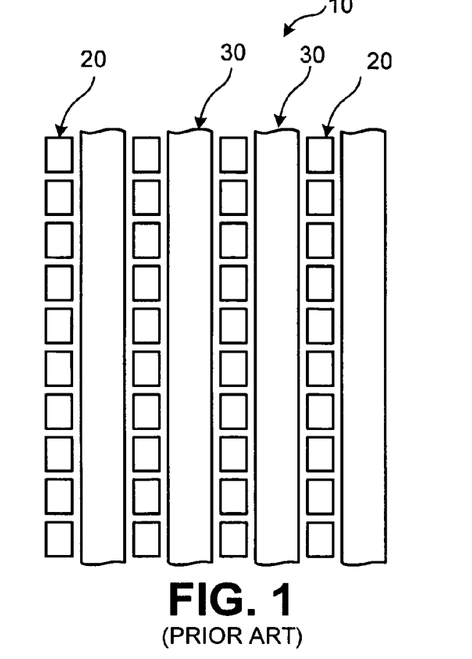
FIG. 1 is a top view of typical prior art image sensor.

FIG. 1 illustrates a prior art image sensor 10 comprised of an array of photodiodes 20 adjacent to vertical charge couple devices (CCD) 30. The photodiodes 20 collect photo-generated charge that is then transferred to a light shielded vertical CCD 30 for read out. Such a CCD image sensor is used for capturing two images closely spaced in time (less than 100 µs). The rapid acquisition of two images is often used for determining the velocity of objects in the image. Such an image is generally referred to as particle image velocimetry (PIV). An example of a camera for PIV is the Redlake Megaplus ES 4.0 camera. A publication describing PIV with this camera is by Luiz M. Lourenco and A. Krothapalli in the Proceedings of the International Conference in Applications of Lasers to Fluid Mechanics, Lisbon, Portugal, July 2000.

Figure 2:
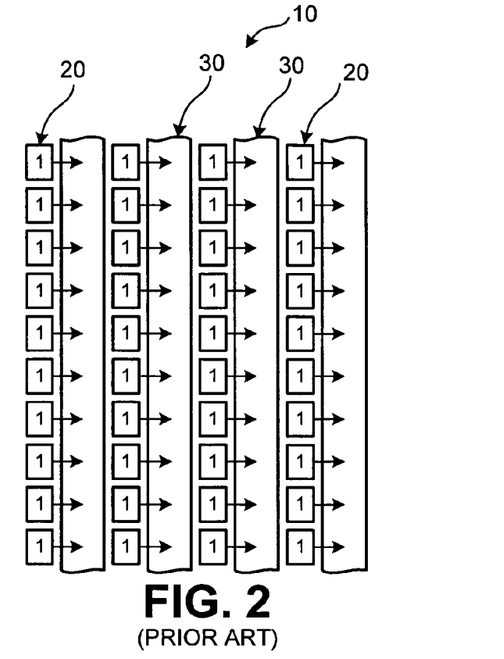
FIGS. 2-6 are top views of FIG. 1 illustrating the typical operation of the prior art image sensor.
Figure 3:
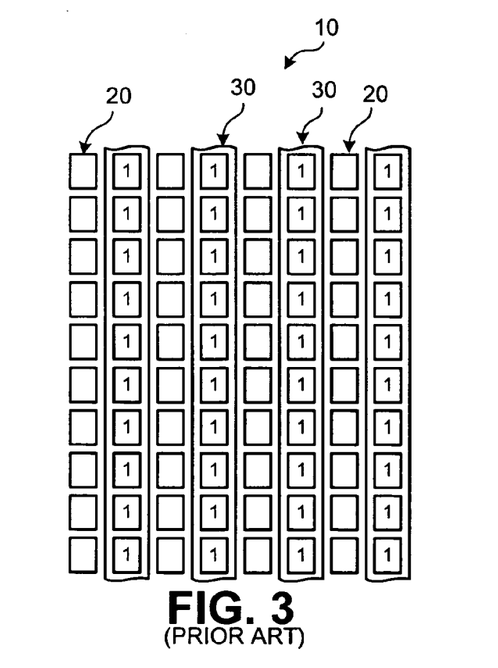
Figure 4:
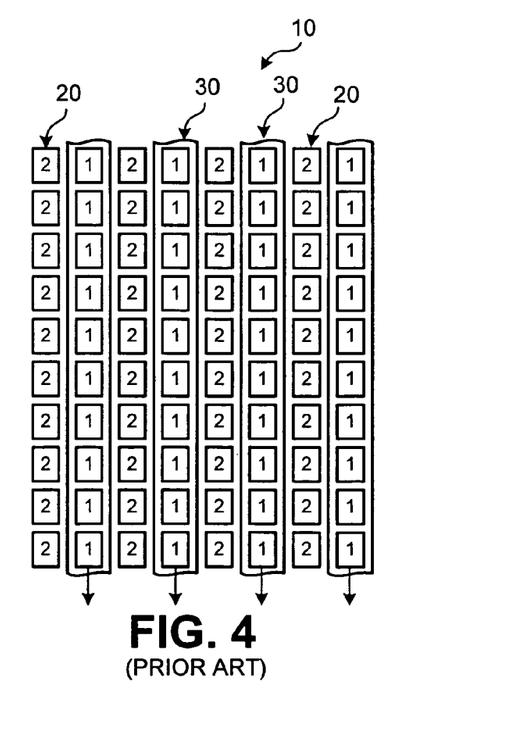
Figure 5:
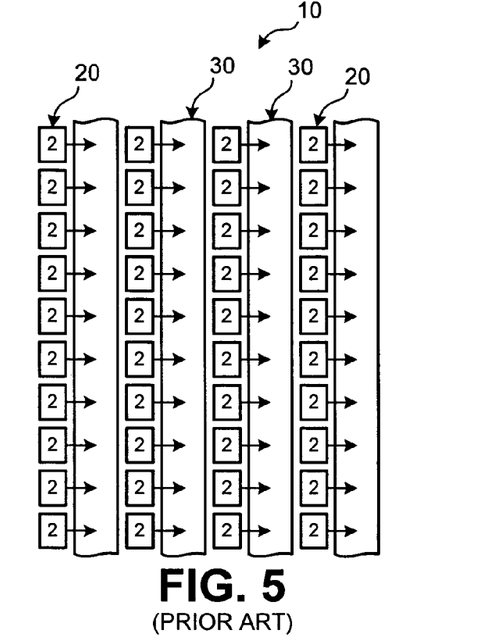
Figure 6:
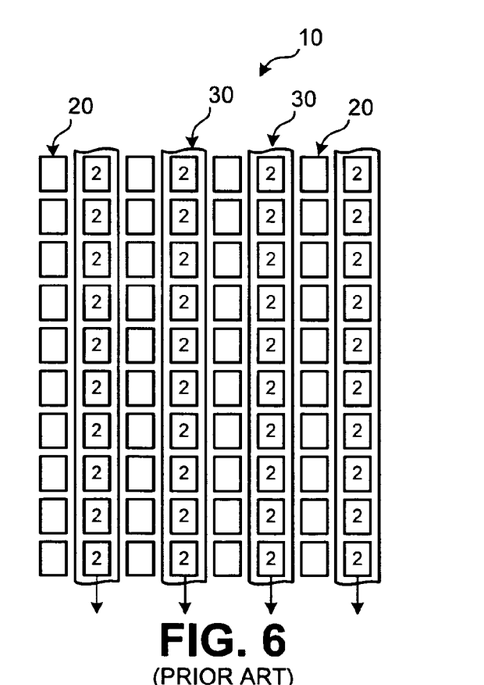

The first step of acquiring a rapid sequence of two images is shown in FIG. 2. A laser or strobe flash illuminates an image scene and is collected by the photodiodes 20. The numeral 1 indicates the first image exposure charge packet in the image sensor 10. Referring to FIG. 3, the charge packets from the first image exposure are transferred to the vertical CCD 30 but not read out of the vertical CCD 30. Not reading out the first image exposure from the vertical CCD 30 saves time and allows a second laser pulse to illuminate the second image capture in the photodiodes as illustrated in FIG. 4. The time period between the first and second laser pulses can be as short as 5 µs. After the second laser pulse, the second image is held in the photodiodes 20 until the first image is read out of the vertical CCD 30. Now referring to FIG. 5, when the vertical CCD 30 is empty the second image is transferred into the vertical CCD 30. Referring to FIG. 6, finally the second image is read out of the vertical CCD 30.

One disadvantage to the image capture sequence outlined in FIGS. 2 through 6 is only two images can be captured in rapid sequence. Consequently, a need exists for capturing more than two images in sequence. The present invention will disclose how to capture three images in rapid sequence.

SUMMARY OF THE INVENTION

The present invention is directed to a method for capturing a sequence of images, the method comprising the steps of (a) capturing a first image on an image sensor having a plurality of photosensitive areas having a first portion of photosensitive areas and a second portion of photosensitive areas; (b) transferring the first portion of the first captured image to a first plurality of storage mechanisms; (c) capturing a second image on the image sensor; (d) transferring the second portion of the second captured image to a second plurality of the storage mechanisms; (e) capturing a third image on the image sensor; (f) reading out the first portion of the first captured image from the first plurality of storage mechanisms and reading out the second portion of the second captured image from the second plurality of storage mechanisms; and (g) reading out the third image.

The above and other objects of the present invention will become more apparent when taken in conjunction with the following description and drawings wherein identical reference numerals have been used, where possible, to designate identical elements that are common to the figures.

Advantageous Effect of the Invention

The present invention has the advantage of capturing three images in rapid sequence.

DETAILED DESCRIPTION OF THE INVENTION

Figure 7:
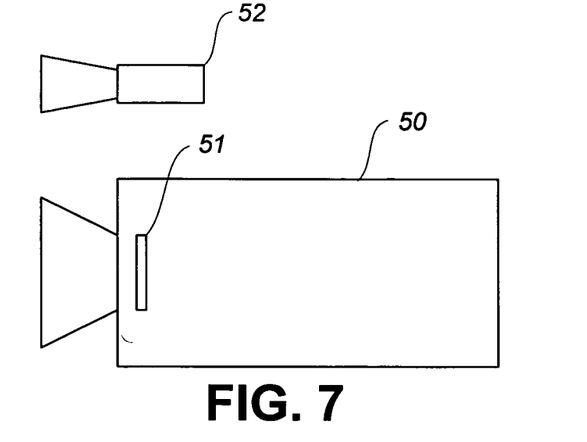
FIG. 7 is a perspective view of a digital camera of the present invention.

Referring to FIG. 7, there is shown a digital camera 50 for capturing images according to the present invention. The camera 50 includes an image sensor 51 that receives incident light that is converted into charge packets representing the captured scene. The camera 50 also includes a flash 52 for providing illumination during image capture if such illumination is necessary.

Figure 8:
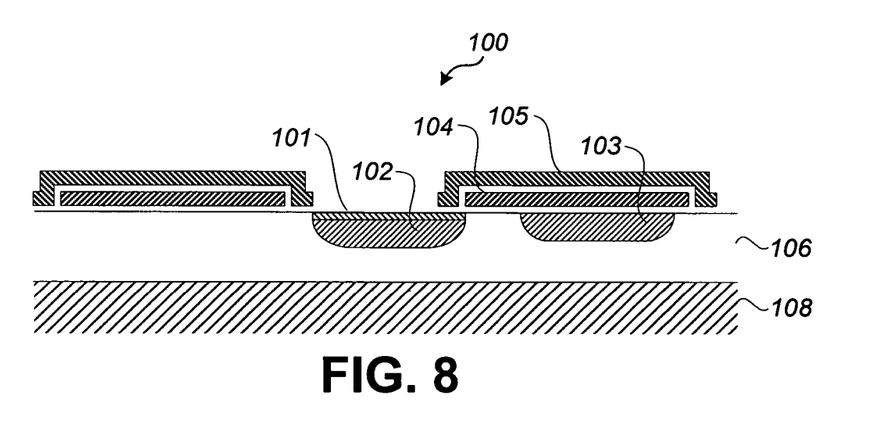
FIG. 8 is a side view in cross section of a CCD type image sensor.

Referring FIG. 8, there is shown a typical pixel 100 for the image sensor of the present invention of the charge-coupled device (CCD) type. In this regard, there is an n-type photodiode 102 with a p-type pinning layer 101 for capturing the image in the form of a charge packet and a transfer gate 104 that is electrically pulsed for transferring the charge packet into an adjacent vertical CCD 103. The vertical CCD 103 is then clocked for transferring the image data therefrom for further processing. The substrate 108 is pulsed at an appropriate level for clearing charge packets out of the photodiodes into the substrate with a vertical overflow drain 106. The vertical overflow drain 106 allows for electronic shuttering which disposes of residual charge in the photodiode 102. The vertical CCD 103 is shielded from light by an opaque layer 105. Charge from the photodiodes 102 is transferred by the transfer gate 104 to the shielded vertical CCD 103 at the end of an image integration time.

Figure 9:
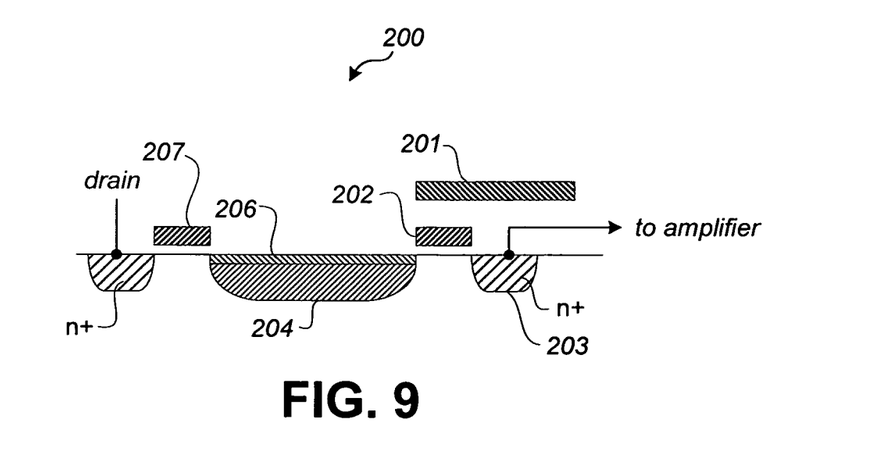
FIG. 9 is a side view in cross section of a CMOS type image sensor.

Referring to FIG. 9, there is shown a typical pixel 200 for the image sensor of the present invention of the CMOS type. In this regard, there is a photodiode 204 with a pinning layer 206 for capturing the image in the form of charge packets. The charge packets are individually addressable for reading out the charge packets as is well known in the art. For clearing charge before image capture, a drain transfer gate 207 is electrically pulsed for transferring residual charge packets to a drain for disposing of residual charge packets and thus preventing undesirable image artifacts. At the end, an image integration exposure charge from the photodiodes 204 is transferred by a gate 202 to a floating diffusion sense node 203 which is shielded from light by an opaque layer 201. The function of the present invention is independent of the image sensor technology employed CCD or CMOS. The common elements of the two image sensor technologies required (or any other image sensor technology) are:

1) a charge collection site for photoelectrons;
2) a mechanism for electronically resetting the charge collection site to zero;
3) a mechanism for transferring charge from the collection site to a. light shielded storage site; and
4) a mechanism for measuring the amount of charge in the shielded storage site.

Figure 10:
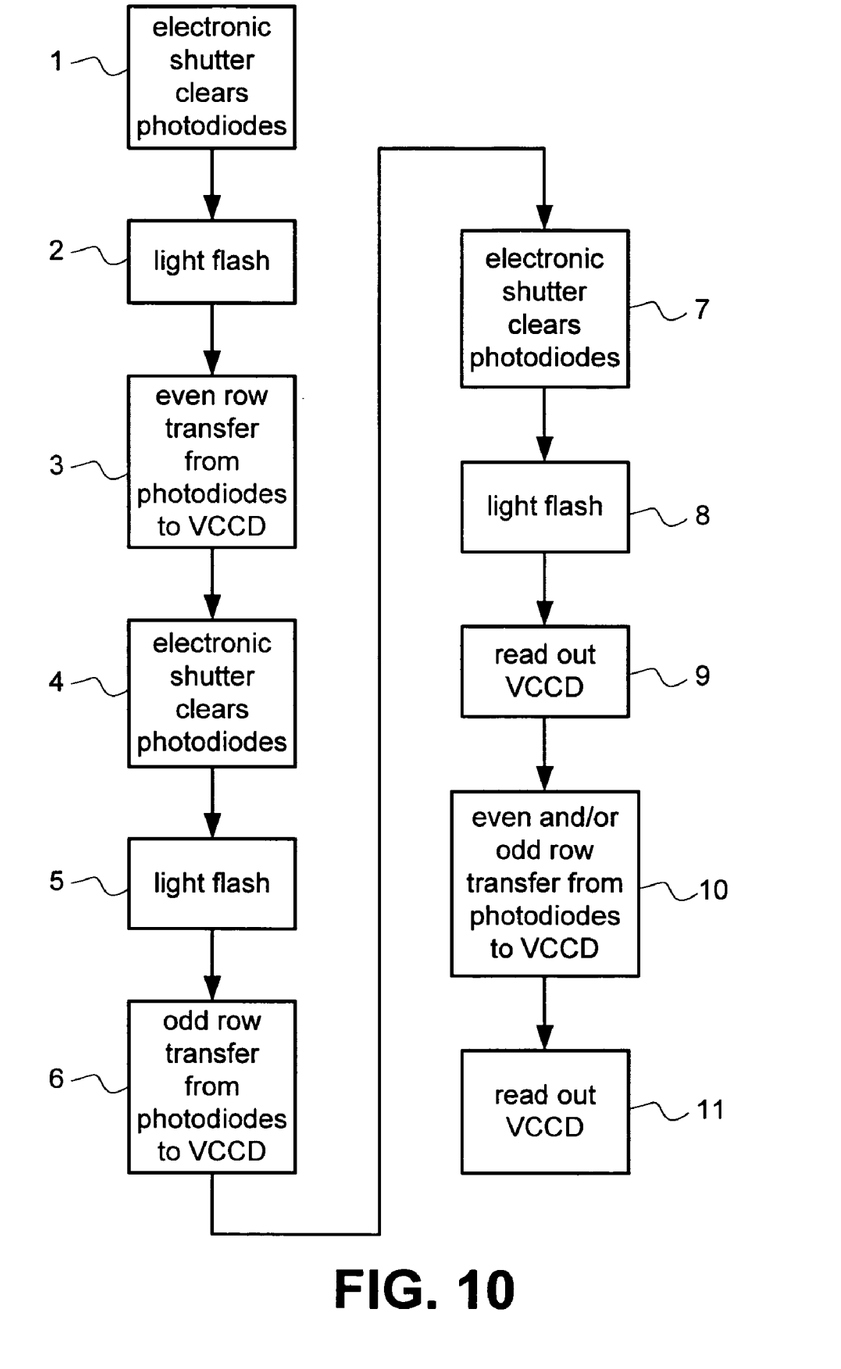
FIG. 10 is a flowchart illustrating the operation of the image sensor of the present invention.
Figure 11A:
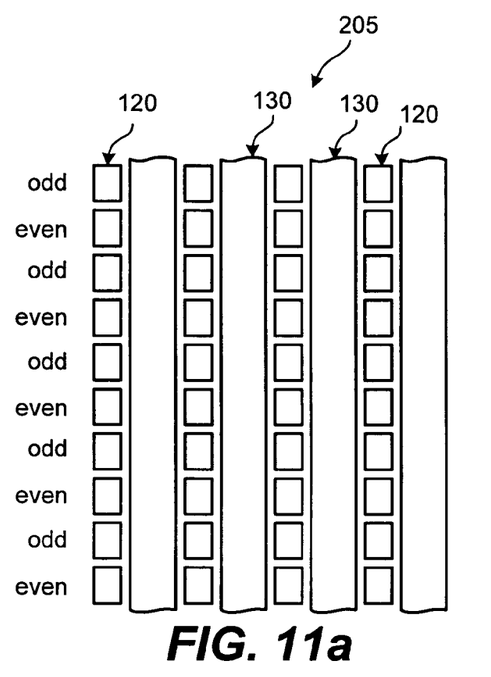
FIGS. 11a-11i are top views of the image sensor of the present invention illustrating image capture and read out.
Figure 11B:
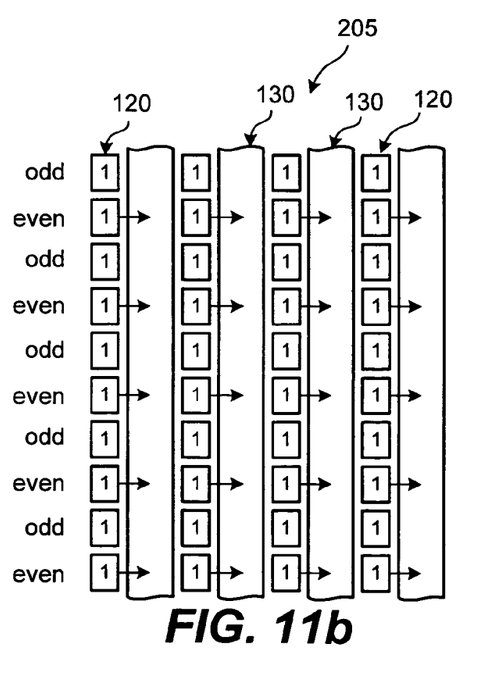
Figure 11C:
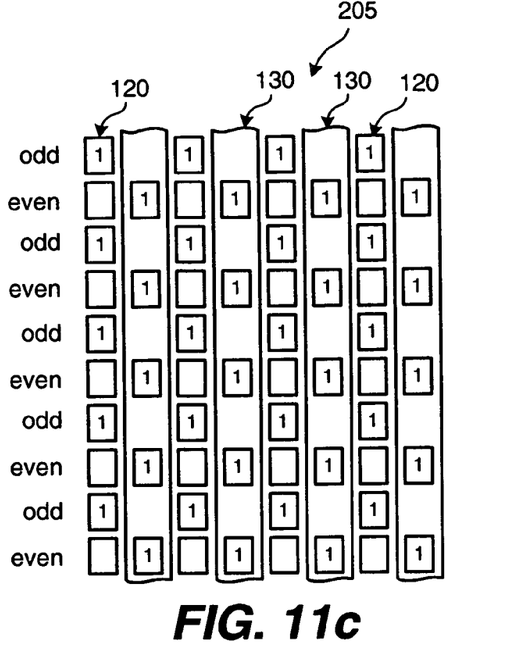
Figure 11D:
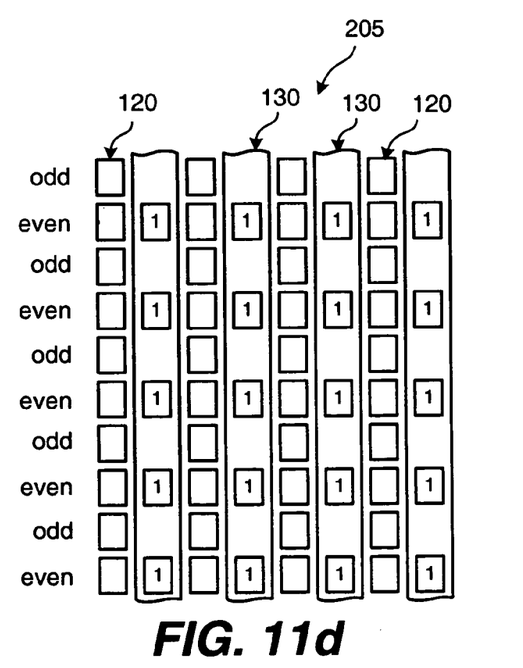
Figure 11E:
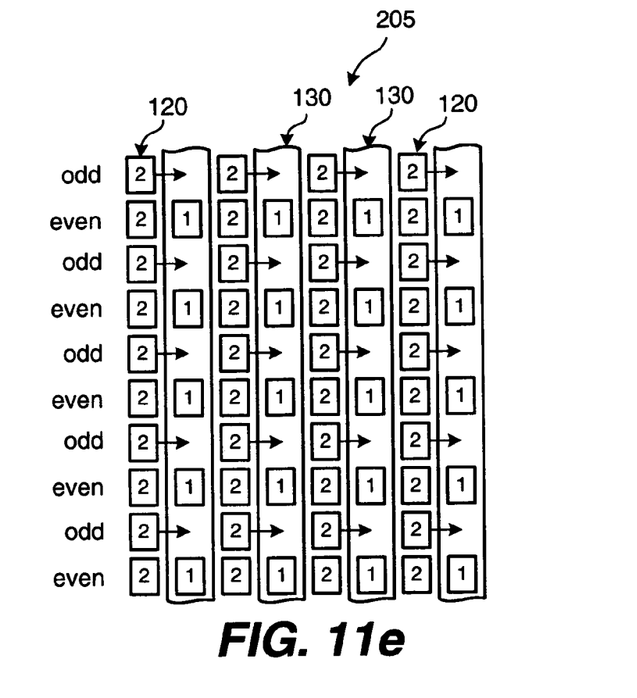
Figure 11F:
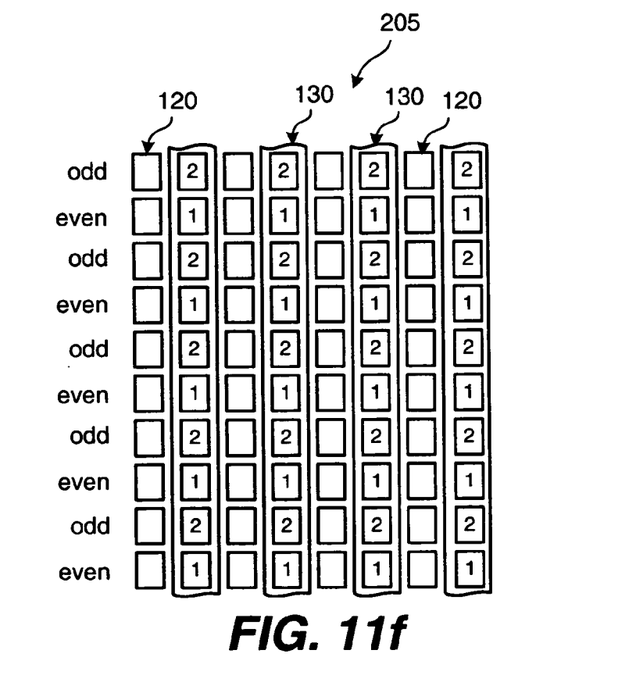
Figure 11G:
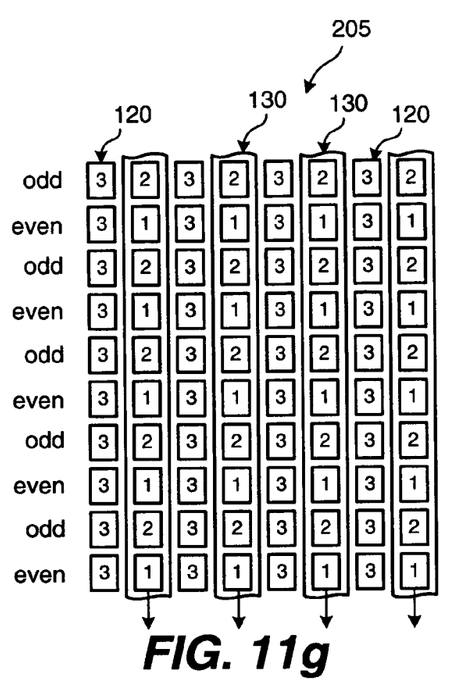
Figure 11H:
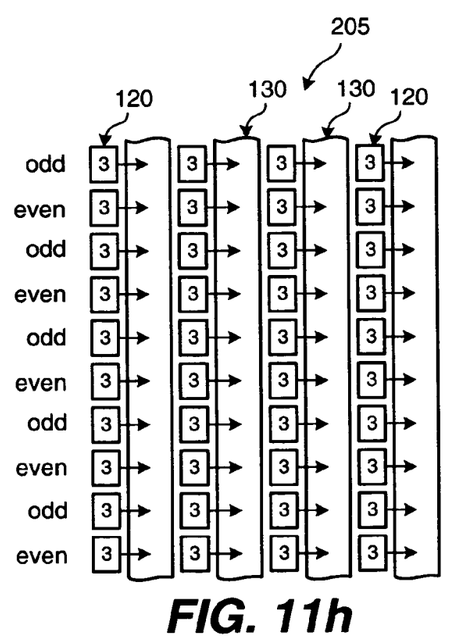
Figure 11I:
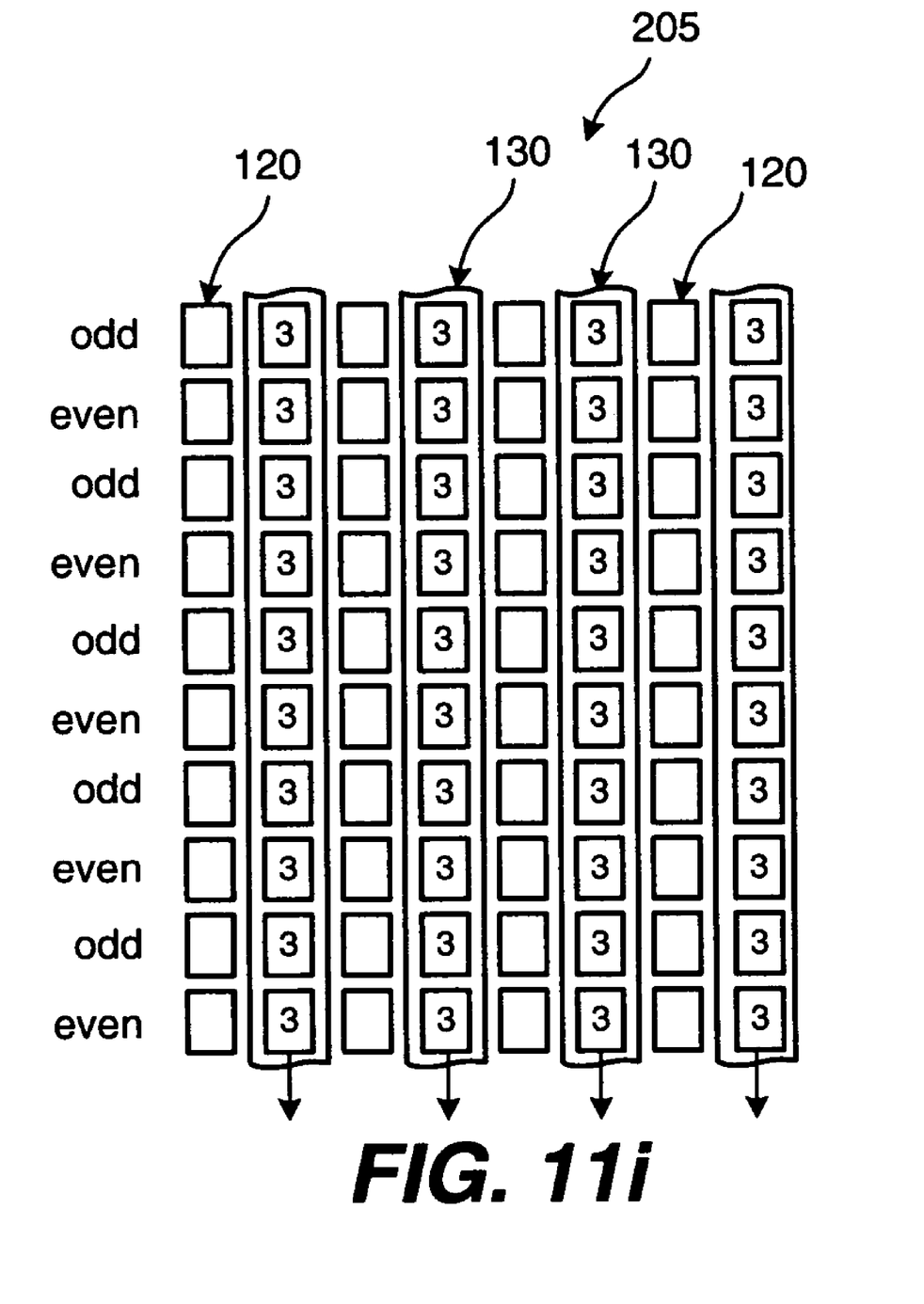

Referring to FIGS. 11*a*-11*i*, there is shown an image sensor 205 of the present invention consisting of an array of photodiodes 120 and columns of vertical CCD's 130. FIG. 10 is a flowchart illustrating the preferred mode of operation of the present invention in a CCD image sensor for the capture of three images in rapid sequence. Referring to both FIGS. 10 and 11*a*-11*i*, the image capture sequence is:

Step 1: The electronic shutter clears all photodiodes (FIG. 11*a*);
Step 2: An external light source flashes to expose the photodiodes to the first image (FIG. 11*b*);
Step 3: Only the even numbered row photodiode charges are transferred to the vertical CCD. (FIG. 11*c*);
Step 4: The electronic shutter clears all photodiodes (FIG. 11*d*);
Step 5: The external light source flashes to expose the photodiodes to the second image (FIG. 11*e*);
Step 6: Only the odd numbered row photodiode charges are transferred to the vertical CCD. (FIG. 11*e*);
Step 7: The electronic shutter clears all photodiodes (FIG. 11*f*);
Step 8: The external light source flashes to expose the photodiodes to the third image (FIG. 11*g*);
Step 9: The first and second image charges are read out of the vertical CCD (FIG. 11*g*);
Step 10: The third image charges in the photodiodes are transferred to the vertical CCD (FIG. 11*h*); and
Step 11: The third image charges are read out of the vertical CCD (FIG. 11*i*).

Figure 12:
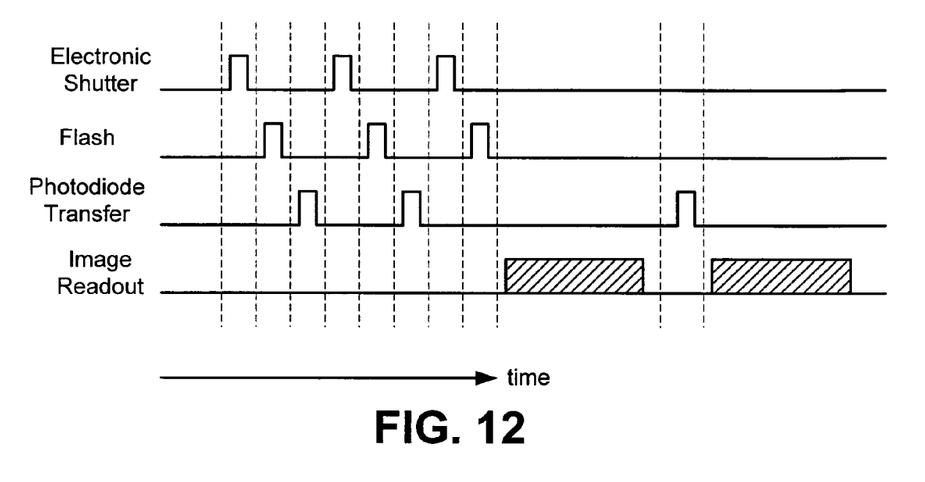
FIG. 12 is a timing diagram for FIG. 11.

Referring to FIG. 12, there is shown the synchronization of the timing signals for the capture of three images. A pulse on the line labeled Electronic Shutter indicate the electronic shuttering mechanism of the image sensor is activated at that time. A pulse on the line labeled Flash indicate when the flash strobe or laser illuminates the image scene. A pulse on the line labeled Photodiode Transfer indicate when an interline CCD would transfer the photodiode charge to the vertical CCD or when a CMOS image sensor would transfer the photodiode charge to the floating diffusion amplifier sense node. The first two photodiode transfer pulses transfer substantially half of the photodiode charges to a light shielded storage node. The hatched regions on the line labeled Image Readout indicate the times when the vertical CCD is read out on an interline CCD image sensor or when the row and column decoder circuits scan a CMOS imager for image readout.

Figure 13:
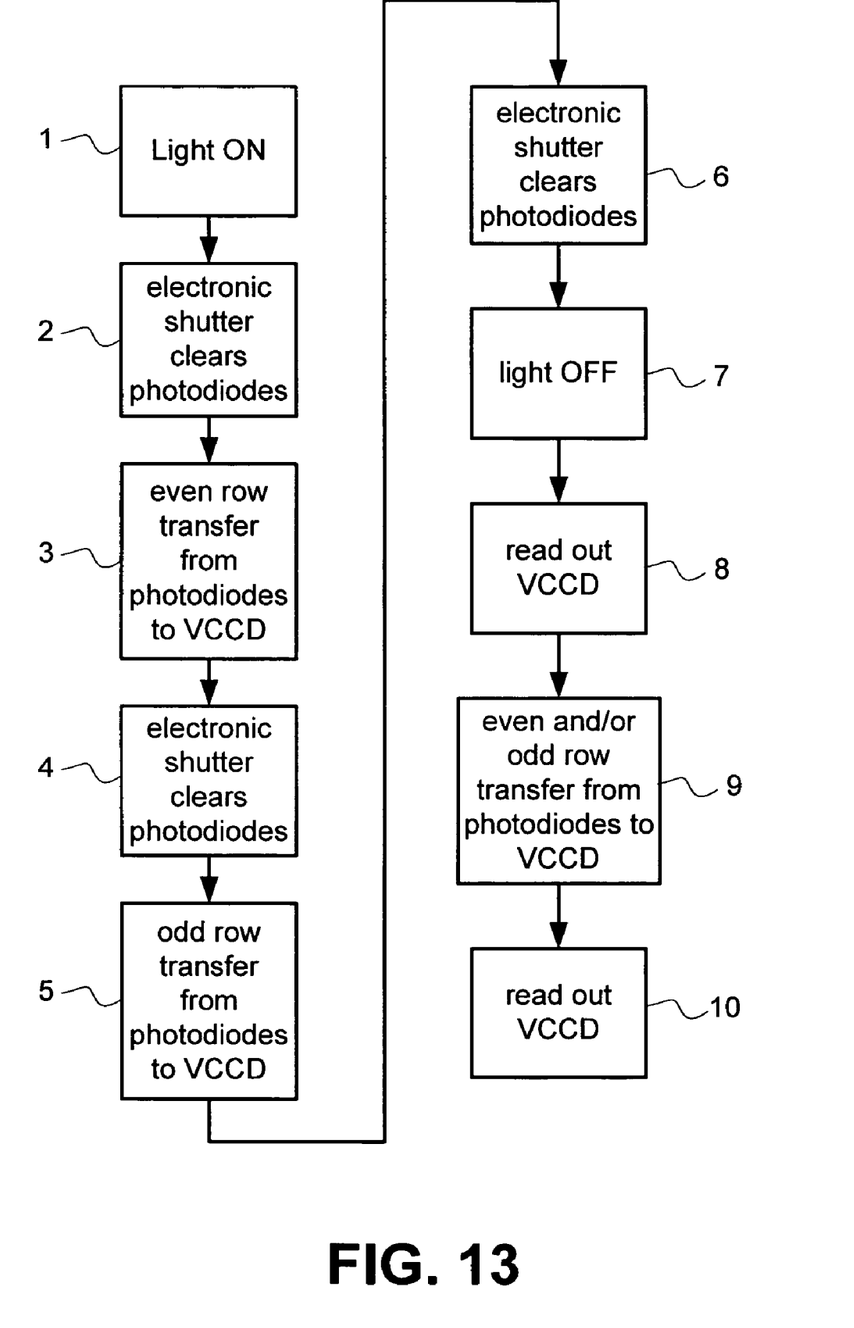
FIG. 13 is a flowchart illustrating an alternative embodiment of the present invention.

A timing sequence for the second embodiment of the invention will now be disclosed. FIG. 13 is a flowchart illustrating the capture of three images in rapid sequence. The image capture sequence is:

Step 1: The light source turns on (not pulsed);
Step 2: The electronic shutter clears all photodiodes and the first image charge is collected in the photodiodes;
Step 3: Only the even numbered row photodiode charges are transferred to the vertical CCD;
Step 4: The electronic shutter clears all photodiodes and the second image charge is collected in the photodiodes;
Step 5: Only the odd numbered row photodiode charges are transferred to the vertical CCD;
Step 6: The electronic shutter clears all photodiodes;
Step 7: The external light source turns off;
Step 8: The first and second image charges are read out of the vertical CCD;
Step 9: The third image charges in the photodiodes are transferred to the vertical CCD; and
Step 10: The third image charges are read out of the vertical CCD.

In the second embodiment of the present invention, the exposure time of the first two images begins with the electronic shutter pulse and ends when photodiode charge is transferred to the light shielded storage node. The third image begins with the third electronics shutter pulse and ends when the light turns off.

Figure 14:
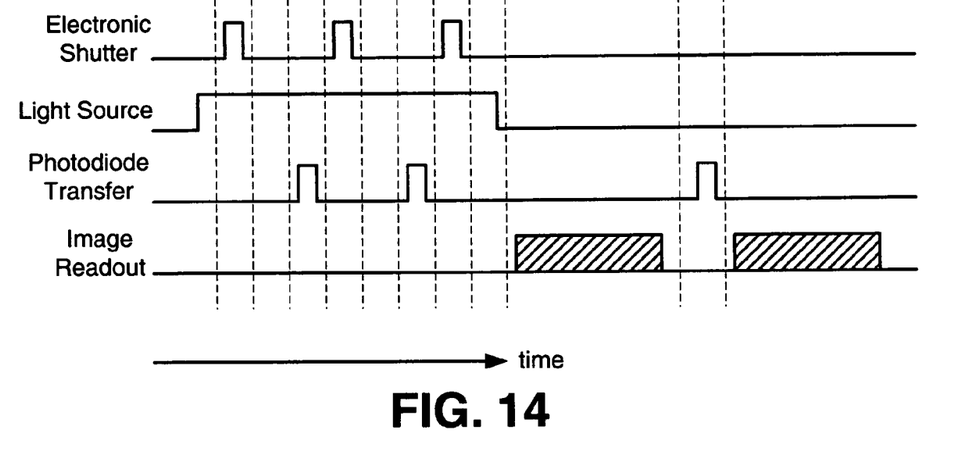
FIG. 14 is a timing diagram for FIG. 14.

FIG. 14 shows the synchronization of the timing signals for the capture of three images in the second embodiment of the invention. A pulse on the line labeled Electronic Shutter indicate the electronic shuttering mechanism of the image sensor is activated at that time. When the line labeled Light Source is high the light source illuminates the image scene. A pulse on the line labeled Photodiode Transfer indicates when an interline CCD would transfer the photodiode charge to the vertical CCD or when a CMOS image sensor would transfer the photodiode charge to the floating diffusion amplifier sense node. The first two photodiode transfer pulses transfer substantially half of the photodiode charges to a light shielded storage node. The hatched regions on the line labeled Image Readout indicate the times when the vertical CCD is read out on an interline CCD image sensor or when the row and column decoder circuits scan a CMOS imager for image readout.

Figure 15:
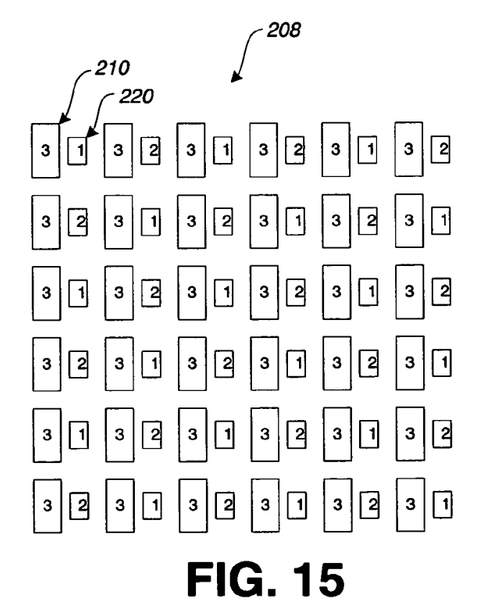
FIG. 15 is a top view of the image sensor of the present invention using the CMOS technology.

The interline CCD interleaves the first two image captures in alternating even/odd rows. CMOS imagers are not restricted to reading out entire rows of photodiodes. Instead a CMOS imager may be configured to interleave the first two image captures in a checker board layout as shown in FIG. 15. The CMOS imager 208 has and array of photodiodes 210 and light shielded charge storage nodes 220. The labels '1', '2', and '3' indicate the locations of charge packets for the first, second, and third image charges. The first and second image charges in the light shielded charge storage nodes 220 are interleaved in a checkerboard layout.

The invention has been described with reference to a preferred embodiment. However, it will be appreciated that variations and modifications can be effected by a person of ordinary skill in the art without departing from the scope of the invention.

PARTS LIST

10 image sensor
20 photodiode
30 vertical CCD
50 digital camera
51 image sensor
52 Flash
100 pixel
101 p-type pinning layer
102 n-type photodiode
103 vertical CCD
104 transfer gate 105 opaque layer
106 vertical overflow drain
108 substrate
120 photodiode
130 vertical CCD
200 pixel
201 opaque layer
202 gate
203 floating diffusion sense node
204 photodiode
205 image sensor
206 pinning layer
207 drain transfer gate
208 CMOS imager
210 photodiode
220 light shielded charge storage nodes

The invention claimed is:

1. A method for capturing a sequence of images with an image sensor that includes a plurality of photosensitive areas that are grouped into a first subset of photosensitive areas and a distinct second subset of photosensitive areas, the method comprising the steps of:
   (a) capturing a first image;
   (b) transferring the first image charges from only the first subset of photosensitive areas to a first plurality of storage mechanisms;
   (c) clearing the first image charges from at least the second subset of photosensitive areas prior to capturing a second image;
   (d) capturing the second image;
   (e) transferring the second image charges from only the second subset of photosensitive areas to a second plurality of storage mechanisms;
   (f) clearing the second image charges from at least the first subset of photosensitive areas prior to capturing, a third image;
   (g) capturing the third image;
   (h) reading out the first and second image charges from the first plurality of storage mechanisms and the second plurality of storage mechanisms; and
   (i) transferring the third image charges, from both the first and second subsets of photosensitive areas to the first and second plurality of storage mechanisms and reading out the third image.

2. The method as in claim 1, wherein the step of (a) capturing the first image comprises (a1) flashing a light source to expose the plurality of photosensitive areas and (a2) capturing the first image.

3. The method as in claim 2 further comprising the step of providing an interlined CCD or CMOS image sensor as the image sensor.

4. The method as in claim 1 further comprising the step of providing an interlined CCD or CMOS image sensor as the image sensor.

5. The method as in claim 1 wherein the first subset of photosensitive areas comprises every other line or column of photosensitive areas and the second subset of photosensitive areas comprises every other line or column not used in the first subset of photosensitive areas.

6. The method as in claim 1 wherein the first subset of photosensitive areas and the second subset of photosensitive areas are grouped to form a checkerboard pattern.

7. The method of claim 1, further comprising the step of clearing charge from the plurality of photosensitive areas prior to capturing the first image.

8. The method as in claim 1, wherein the step of (d) capturing the second image comprises (d1) flashing a light source to expose the plurality of photosensitive areas and (d2) capturing the second image.

9. The method as in claim 1, wherein the step of (g) capturing the third image comprises (g1) flashing a light source to expose the plurality of photosensitive areas and (g2) capturing the third image.

* * * * *